United States Patent Office 3,036,093
Patented May 22, 1962

---

3,036,093
2-CARBOXYETHYLSUCCINIC ANHYDRIDE
John W. Lynn, Charleston, and Richard L. Roberts, Milton, W. Va., assignors to Union Carbide Corporation, a corporation of New York
No Drawing. Filed May 18, 1959, Ser. No. 813,634
2 Claims. (Cl. 260—346.8)

This invention relates to the preparation of 2-carboxyethylsuccinic anhydride. In one of its aspects, this invention relates to a purification method for producing crystalline 2-carboxyethylsuccinic anhydride of high purity.

This invention provides crystalline 2-carboxyethyl-succinic anhydride as a novel compound which is useful as an intermediate in the preparation of other valuable materials and has further utility as a hardener for the production of epoxy resins having desirable properties.

Methods for preparing organic acid anhydrides generally involve the remvoal of the elements of water from corresponding organic acid derivatives. 2-carboxyethylsuccinic anhydride can be prepared by thermal dehydration of 1,2,4-butanetricarboxylic acid or by interaction of 1,2,4-butanetricarboxylic acid with acetic anhydride, or acetyl chloride or phosgene. Dehydration of polycarboxylic acids to form acid anhydrides proceeds with difficulty and the literature relating to these reactions describes many of the products as "intractable masses" and "viscous non-crystalline syrups and gums." As with other polycarboxylic acids containing three or more carboxyl groups, the dehydration of 1,2-4-butanetricarboxylic acid to form 2-carboxyethylsuccinic anhydride is characterized by the production of viscous, dark brown syrup and tar mixtures. Distillation of the crude product mixtures is accompanied by decomposition, and any 2-carboxyethylsuccinic anhydride recovered as a distillate fraction is invariably an impure, low-melting product.

Purification of the dehydration reaction product mixtures by crystallization from a wide variety of solvents does not afford a satisfactory product. Hence, pure 2-carboxyethylsuccinic anhydride is not readily obtained in a practical yield, and in some reaction and product recovery procedures no product at all is recoverable. However, it has been discovered that pure 2-carboxyethylsuccinic anhydride can be recovered from the product mixtures produced by the removal of the elements of water from 1,2,4-butanetricarboxylic acid by dissolving the said product mixtures in ethylene dichloride and crystallizing purified 2-carboxyethylsuccinic anhydride from the ethylene dichloride solution. The effectiveness of ethylene dichloride as a purification medium was unexpected because of the failure of other solvents to accomplish the desired product purification. This discovery was especially surprising in view of the fact that carbon tetrachloride, 1,1,2-trichloroethane and chloroform were found to be ineffective and impractical as crystallization media for separating 2-carboxyethylsuccinic anhydride of enhanced purity from the dehydration recation product mixtures. Ethylene dichloride has solubility characteristics uniquely adapted for selectively separating 2-carboxyethylsuccinic anhydride from other organic materials. It is to be expected that ethylene dichloride would be useful for purifying 2-carboxyethylsuccinic anhydride produced by synthetic methods other than the removal of water from 1,2,4-butanetricarboxylic acid.

The purification of 2-carboxyethylsuccinic anhydride with ethylene dichloride is readily accomplished by dissolving the material in hot ethylene dichloride and then allowing the solution to cool until crystals of 2-carboxyethylsuccinic anhydride separate. The 2-carboxyethylsuccinic anhydride thus provided is comparatively pure. If further purification is desired, then recrystallization from the same solvent is repeated. A minimum amount of ethylene dichloride is preferably employed to reduce the amount of anhydride product remaining in the mother liquor. A quantity of ethylene dichloride between about 200 and 500 weight percent, based on the weight of material being purified, is satisfactory for performing the purification. The material is dissolved in ethylene dichloride by heating the solvent to a temperature between about 50° C. and its boiling point at ordinary atmospheric pressure. It is advantageous to treat the hot ethylene dichloride solution of anhydride product with decolorizing charcoal, and remove the charcoal by filtration before the solution is permitted to cool to room temperature or below. The filtration step also serves to remove any organic matter insoluble in hot ethylene dichloride, including unreacted 1,2,4-butanetricarboxylic acid, which is contained in the crude product mixture being purified.

2-carboxyethylsuccinic anhydride is a white crystalline solid having a melting point of 63° C. to 64° C. The structure of the compound is confirmed by elemental analysis, anhydride titration and by infrared spectral analysis. Infrared spectrum absorption maxima in the carbonyl region are observed which are characteristic of five-membered ring anhydrides. Confirmation of product structure is necessary because dehydration of 1,2-4-butanetricarboxylic acid theoretically can produce at least two cyclic anhydride structures:

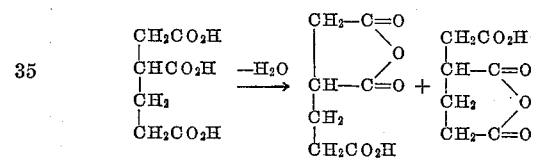

As previously mentioned, 2-carboxyethylsuccinic anhydride is applicable as an epoxy resin hardener for the production of resinous materials having desirable properties. In addition, the anhydride is an extremely versatile intermediate for the preparation of polyfunctional acids or esters containing a variety of functional groups. For example, 2-carboxyethylsuccinic anhydride will react with mono- or di-functional alcohols, amines and thiols to form polybasic acids containing ester, ether, amide or thiol linkages:

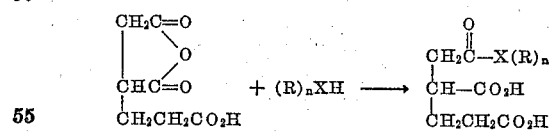

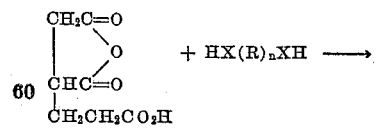

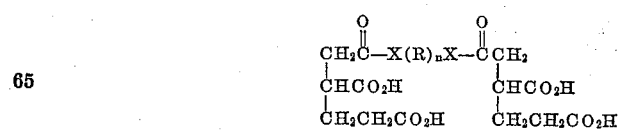

wherein R is selected from aliphatic and aromatic radicals and the like, X is oxygen, sulfur and nitrogen radicals, and $n$ is an integer which satisfies the valence of said X.

The following examples will serve to illustrate specific embodiments of the invention.

Example 1

This example illustrates the unsatisfactory results obtained when 2-carboxyethylsuccinic anhydride is prepared without benefit of the purification method of this invention.

A mixture of 1,2,4-butanetricarboxylic acid (1 mole) and ethylbenzene (500 grams) was stirred and heated to reflux (135° C.). Acetic anhydride (1 mole) was added dropwise to the refluxing mixture over a period of about forty minutes. Ethylbenzene-acetic acid azeotrope (boiling point 115° C.) was removed continuously as distillate until the evolution of acetic acid had ceased. Analysis of the distillate indicated that 1.8 moles of acetic acid had evolved (theory 2.0). The crude reaction product was recovered as a viscous, dark brown tar. The crude product was distilled and a fraction was recovered having a boiling point of 184° C. at 2.2 millimeters of mercury, a melting point of 51° C. to 96° C. and a titration equivalent[1] of 66.2. This material was reacted with aniline, and a white crystalline solid with a melting point of 144° C. to 145° C. was recovered in a yield calculated to be 51 percent of the theoretical. It was identified as the anilic acid of 2-carboxyethylsuccinic anhydride by elemental analysis.

Calculated for $C_{13}H_{15}O_5N$: C, 58.86; H, 5.70; N, 5.28. Found: C, 58.58; H, 5.90; N, 5.85.

Example 2

This example illustrates the unsatisfactory results obtained when 2-carboxyethylsuccinic anhydride is prepared without benefit of the purification method of this invention.

1,2,4-butanetricarboxylic acid (56 grams, 0.295 mole), dissolved in 500 milliliters of dry acetone, was treated with 100 milliliters of an acetone solution of triethylamine (59.6 grams, 0.59 mole) at room temperature, and the resulting mixture was allowed to stand at room temperature for thirty minutes. With vigorous agitation, liquid phosgene (29.2 grams, 0.295 mole) was added to the mixture at about 0° C. over a period of ten minutes and the resulting product mixture was then filtered. The filtrate was evaporated to a temperature of 60° C. at 2 millimeters of mercury, and a crude product residue (56 grams) was recovered. Recrystallization of the crude product from acetic acid followed by washing with hexane yielded a material having a melting point of 56° C. to 59° C.

Example 3

This example illustrates the excellent results obtained in the preparation of 2-carboxyethylsuccinic anhydride when the crude product is purified by the invention method employing ethylene dichloride solvent.

A mixture of 1,2,4-butanetricarboxylic acid (2 moles), acetic anhydride (2.15 moles) and previously dried ethylbenzene (700 grams) was charged to a distillation flask fitted with an efficient, glass-packed column. The reaction mixture was heated to reflux at a pressure of 50 millimeters of mercury. Acetic acid-ethylbenzene azeotrope (boiling point 47° C. at 50 millimeters of mercury) was removed continuously until the formation of acetic acid ceased. Titration of the distillate indicated that 4.05 moles of acetic acid had evolved (theory 4.0 moles). The product mixture was cooled and supernatant ethylbenzene was decanted from the insoluble product. The product was dissolved in hot ethylene dichloride, treated with decolorizing carbon and allowed to cool and crystallize overnight. Upon filtration there was obtained a 91 percent yield of fine, white crystals (melting point 62° C. to 63° C.) identified as 2-carboxyethylsuccinic anhydride by anhydride titration (100.3 percent),[2] infrared spectral (5-membered ring anhydride absorption) and elemental analysis.

Calculated for $C_7H_8O_5$: C, 48.84; H, 4.68. Found: C, 49.14; H, 4.68.

Example 4

A mixture of 1,2,4-butanetricarboxylic acid (3 moles) and previously dried nonane (1200 grams) was charged to a reaction flask fitted with a short, glass-packed distillation column and a decanter-type stillhead. The reaction mixture was heated to reflux and the reaction was continued until the nonane-water azeotrope had ceased to evolve from the reaction mixture. The reaction mixture was cooled and none was separated from the crude solid product by decantation. The solid product was dissolved in hot ethylene dichloride and upon cooling a crystalline product separated. The white crystalline product was recovered and represented a yield of 87.8 percent of 2-carboxyethylsuccinic anhydride (melting point 63° C. to 64° C.). The structure of the compound was confirmed by infrared analysis (5-membered ring anhydride absorption) and elemental analysis.

Calculated for $C_7H_8O_5$: C, 48.84; H, 4.68. Found: C, 48.83; H, 4.72.

Evaporation of the ethylene dichloride filtrates yielded an additional amount of 2-carboxyethylsuccinic anhydride which raised the yield to 92.6 percent.

Example 5

A mixture of 1,2,4-butanetricarboxylic acid (1 mole), acetyl chloride (3 moles) and previously dried 1,4-dioxane (300 grams) was charged to a flask and heated to 60° C. to 70° C. with stirring. Hydrogen chloride began to evolve and the reaction was continued for seven and one-half hours until the evolution of hydrogen chloride ceased. The reaction mixture was then cooled and stripped of excess acetyl chloride and other volatiles under reduced pressure at 25° C. A crude residue was recovered and dissolved in hot ethylene dichloride, and crystalline 2-carboxyethylsuccinic anhydride was recovered as in the previous examples. The product (77.9 percent yield) had a melting point of 63° C. to 64° C., a purity of 103.4 percent by anhydride titration, and the following elemental analysis.

Calculated for $C_7H_8O_5$: C, 48.84; H, 4.68. Found: C, 48.52; H, 4.61.

The product was further identified by infrared analysis. Additional product was recovered from the ethylene dichloride filtrate raising the yield to 92.6 percent.

What is claimed is:

1. 2-carboxyethylsuccinic anhydride.
2. A method of purifying 2-carboxyethylsuccinic anhydride produced by dehydration of 1,2,4-butanetricarboxylic acid which comprises dissolving said 2-carboxyethylsuccinic anhydride in ethylene dichloride and crystal-

---

[1] This value is the equivalent weight of the compound, calculated from a direct titration with standard aqueous solution of sodium hydroxide.

[2] Anhydride purity was determined by an analytical method which allows the determination of organic anhydrides in the presence of organic acids by two direct titration steps with sodium hydroxide. In the presence of pyridine, anhydrides can be titrated directly with aqueous sodium hydroxide, each mole of anhydride requiring two equivalents of sodium hydroxide. Under anhydrous conditions, anhydrides react with an excess of analine to form one equivalent of titratable acid and one equivalent of a neutral anilide. In each case, any organic acid present titrates directly, requiring one equivalent of sodium hydroxide for each carboxyl group. Thus, by performing two titrations, the amount of sodium hydroxide consumed in titration of the reaction products is a direct measure of the free acid plus the anhydride present. The difference between the titration of the two reactions is a direct measure of the acid anhydride (which figure is quoted above) and the difference between twice the titration in the aniline reaction and the direct titration in pyridine is a measure of the organic acid.

lizing from the ethylene dichloride solution 2-carboxyethylsuccinic anhydride of enhanced purity.

References Cited in the file of this patent

Karrer: Organic Chemistry (second English edition, 1946), p. 261.

Prill: J. Am. Chem. Soc., vol. 70 (1948), p. 2828.

Lowy: Introduction to Organic Chemistry (seventh edition, 1951), pp. 134–5.

Weissberger: Technique of Organic Chemistry, vol. 3, part 1 (1956), p. 560.

Migrdichian: Organic Synthesis, vol. 1 (1957), pp. 291–3.